Patented Sept. 23, 1952

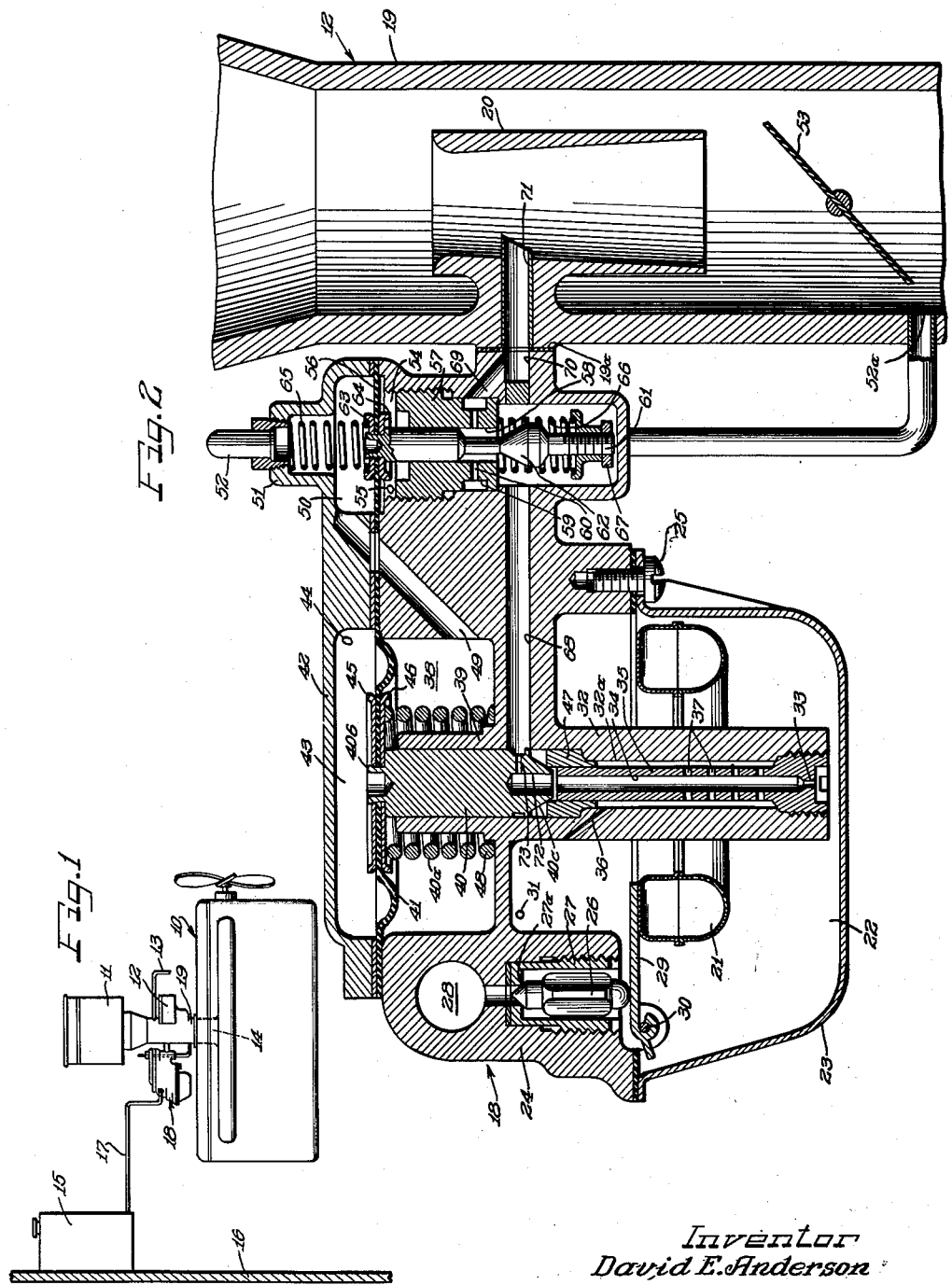

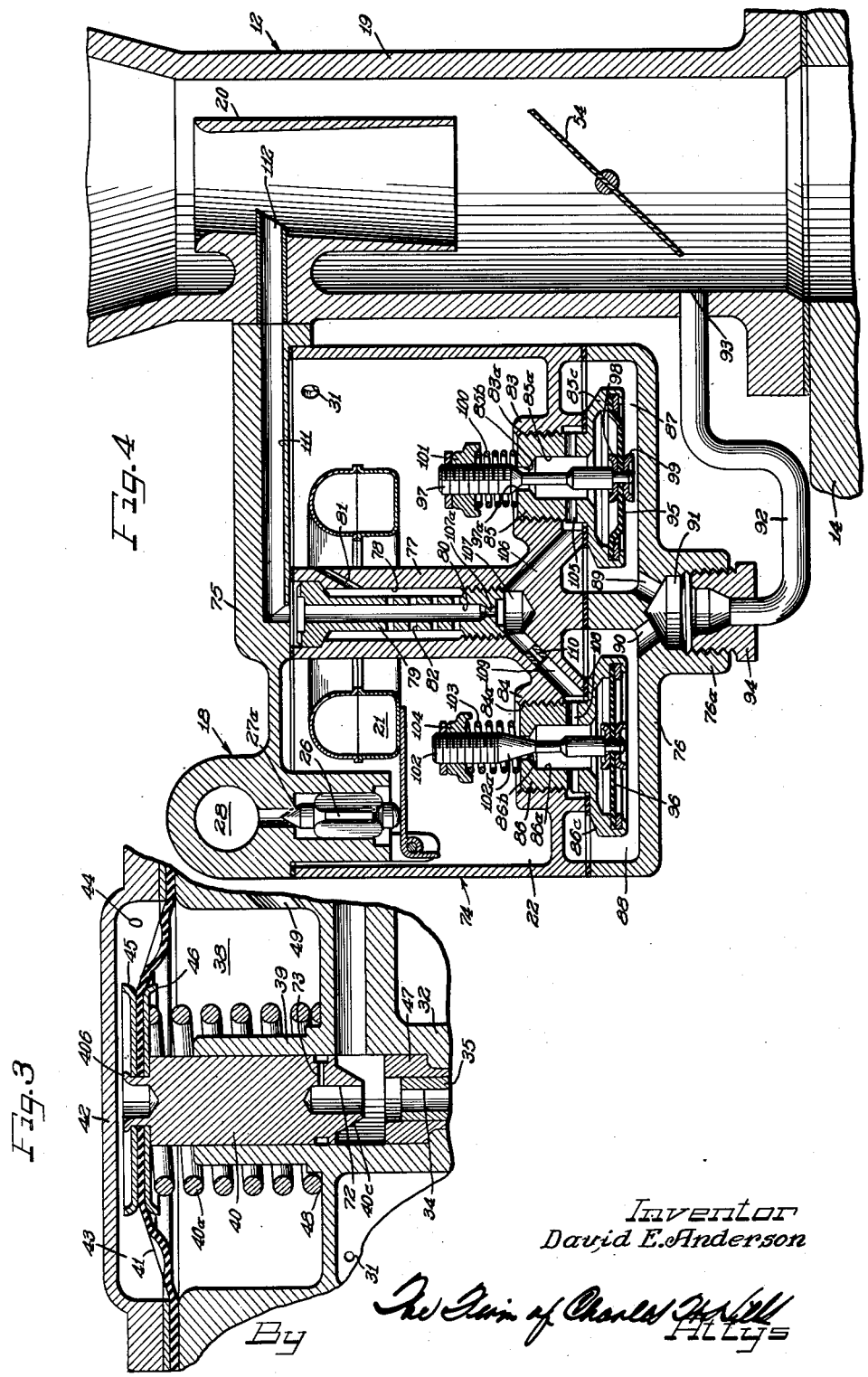

2,611,594

UNITED STATES PATENT OFFICE 2,611,594

SUPPLEMENTARY FLUID FEED DEVICE WITH AUTOMATIC TANDEM METERING VALVES

David E. Anderson, Shaker Heights, Ohio, assignor to Thompson Products, Inc., Cleveland, Ohio, a corporation of Ohio Application October 27, 1948, Serial No. 56,792

15 Claims. (Cl. 261—41)

The present invention relates to a supplementary fuel feeding device for use with internal combustion engines and more particularly relates to devices for feeding supplementary fuel to an internal combustion engine through a plurality of metering valves actuated under different engine operating conditions to insure the feeding of sufficient supplementary fuel to prevent engine detonation and preignition.

It has been proposed that supplementary fuel, such as mixtures of alcohol and water, be injected into the intake manifold of the engine in amounts controlled by the engine intake manifold vacuum to prevent detonation and preignition while the engine is operating under conditions of high load, high speed, or rapid acceleration. Such devices generally employ a diaphragm-controlled valve, the diaphragm being subject to the intake manifold vacuum to control movement of the valve in accordance with the operating characteristics of the engine.

The present invention now provides an improved metering device for the feeding of supplementary fuel into an internal combustion engine in accordance with the operating conditions of the engine. In general, the device comprises a casing defining a reservoir for containing a pond of supplementary fuel introduced therein through a float controlled valve connected to a suitable source of supplementary fuel. Supplementary fuel is fed from the reservoir into the fuel intake system of the engine through a conduit for connecting the engine with the fuel intake preferably in advance of the engine throttle valve. Preferably, supplementary fuel is injected into the throat of the carburetor venturi in which the main fuel-air stream is formed for subsequent introduction into the manifold intake of the engine.

The plurality of spring-urged, diaphragm-controlled metering valves, preferably two, are provided for controlling the flow of supplementary fuel through the conduit into the engine. In each valve, a spring urges the valve to open position against the resistance of a diaphragm having one surface subjected to atmospheric pressure and the other surface subjected to manifold intake vacuum of the engine. In the device of the present invention employing two or more valves, the springs and diaphragms are so constructed and regulated that the valves are actuated at different manifold intake vacuums to establish the flow of supplementary fuel from the reservoir to the engine. By this arrangement, more efficient feeding of supplementary fuel is obtained in that the flow of supplementary fuel is more nearly correlated to the actual operating conditions of the engine to which the device is attached. For example, the primary metering valve may be operable to establish flow of supplementary fuel at engine intake manifold vacuums ranging from about 0 to about 35–50 inches of water while the secondary valve (or valves) is operable at manifold vacuums ranging from 0 to 70–100 inches of water. Thus all of the metering valves are open for full metered flow of supplementary fuel under those conditions of low vacuum which are most conducive to engine detonation and pre-ignition while the secondary valve (or valves) remains open, after the primary valve is closed, at higher engine vacuums to meter a lesser amount of fuel under the influence of this higher vacuum.

In one specific embodiment of the present invention a main metering valve is placed in the conduit leading from the feeding device to the engine and is controlled by the manifold vacuum-vented diaphragm. The valve is operable to be seated at relatively low vacuums so that fuel is primarily passed through the conduit beyond this valve only at those conditions where predetonation is most likely to occur. This primary valve is also provided with a by-pass to permit flow of supplementary fuel through a restricted orifice even though the primary valve itself is closed. A second diaphragm controlled valve is located in the conduit between the primary valve and the engine and this valve is operable to remain open at manifold vacuums considerably in excess of those sufficient to seat the primary valve, with the second valve also being seated at high manifold vacuums, where knock and predetonation do not occur. The second valve is open during all periods of operation at which the primary valve is opened and the second valve controls the flow of supplementary fuel by-passed through the primary valve at higher manifold vacuums, with the introduction of fuel being regulated by the intake manifold vacuum controlling movement of the second valve.

In the second embodiment of the present invention, a pair of diaphragm controlled valves are located within the fuel reservoir for controlling the flow of supplementary fuel from the reservoir through a conduit into the engine itself. These valves are likewise operable at different manifold vacuums to effect the feeding of supplementary fuel to the engine in accordance with the operating conditions thereof. The primary valve is operable to close at relatively low manifold vacuums while the secondary metering valve remains open to selectively meter the supplementary fuel to the engine through a restricted orifice placed in the conduit.

It is, therefore, an important object of the present invention to provide a supplementary fuel feeding device for internal combustion engines employing a plurality of diaphragm operated valves responsive to the intake manifold vacuum of the engine to control the flow of supplementary fuel from a reservoir into the engine.

Another important object of the present invention is to provide a supplementary fuel feeding device with a pair of successively closing metering valves actuated at different manifold vacuum ranges to feed varying amounts of supplementary fuel to the engine in accordance with the operating conditions of the engine.

It is a further important object of the present invention to provide a supplementary fuel feeding device regulated by a primary valve having a by-pass for permitting restricted flow even when the primary valve is seated and a second metering valve for controlling the flow from the by-pass.

A still further important object of the present invention is to provide a supplementary fuel feeding device with a pair of diaphragm controlled metering valves regulating flow of supplementary fuel with both valves being open at very low manifold vacuums to permit full metered flow of supplementary fuel under engine operating conditions most conducive to detonation and pre-ignition and with one valve remaining open after the other valve has closed to meter restricted flow of the fuel under high vacuums.

On the drawings:

Figure 1 is a diagrammatic side elevation view of an internal combustion engine and fuel intake assembly equipped with a supplementary fuel feeding device of the present invention;

Figure 2 is a cross-sectional view, with parts shown in elevation, of the supplementary fuel feeding device of Figure 1;

Figure 3 is a fragmentary, enlarged cross-sectional view similar to Figure 2 and illustrating the open position of the primary valve at relatively low manifold vacuum; and Figure 4 is a cross-sectional of a modified form of supplementary fuel feeding device of the present invention as mounted on an internal combustion engine.

As shown on the drawings:

In Figure 1 reference numeral 10 refers generally to a high compression internal combustion engine equipped with the customary fuel and air-charging assembly including an air cleaner 11, a carburetor 12 receiving air from the cleaner 11 and main fuel from the feed line 13, the main fuel-air mixture being fed into the intake manifold 14 of the engine 10 for subsequent introduction into the combustion chambers of the engine. A relatively small tank 15 for supplementary anit-detonant fuel, such as a mixture of 85% water, 15% methanol and 3 cc. per gallon tetraethyl lead is mounted in the fire wall 16 of engine 10 and is connected through line 17 to a supplementary fuel feeding device 18 of the present invention.

The supplementary fuel feeding device 18 is illustrated in greater detail in Figure 2 in which the device 18 is mounted on a pad 19a of the air intake 19 of carburetor 12 in a position adjacent the carburetor venturi 20 adapted to form a main fuel-air mixture from air entering the air intake 19 from cleaner 11 and fuel introduced into the venturi 20 from a conventional carburetor jet (not shown).

The supplementary fuel feeding device 18 as shown in Figure 2 includes a float 21 mounted in a chamber 22 defined by a bottom cup or bowl 23 and an upper casing 24, the bowl 23 being secured to the casing 24 by suitable means, as by screw 25 threadedly retained by the casing 24. The float 21 controls the introduction of supplementary fuel into the flow chamber 22 by means of an inlet needle valve 26 movable within an orifice housing 27 threadedly retained by casing 24 and defining a restricted orifice 27a. The orifice 27a is connected to an inlet port 28 receiving supplementary fuel through the tube 17 and the movement of the valve 26 into contact with the orifice 27a controlled by float support arm 29 pivoted to the casing by pin 30. Float chamber 22 is vented to atmospheric pressure through vent 31 communicating with the exterior atmosphere.

Casing 24 is provided with a depending boss 32 axially bored as at 32a and having a restricted orifice 33 formed in its lower extremity and communicating with an axial passage 34 provided by tube 35 extending axially through the depending boss 32. Tube 35 is vented to atmosphere through vent 36 and passage 34 is vented to atmosphere through holes 37 formed in the tube 35.

A spring chamber 38 is provided within the upper portion of the casing 24 and a boss 39, formed integrally with the casing 24, extends upwardly into the chamber 38. Boss 39 is axially bored to receive a diaphragm and spring-urged valve 40. Valve 40 is guided by boss 39 and is urged downwardly within the boss by a diaphragm 41 secured in position to overly chamber 38 by a cover member 42 defining a recessed air chamber 43, vented to atmosphere through vent 44, directly overlying the upper surface of diaphragm 41. Diaphragm 41, secured to valve 40 by washer members 45 and 46, is thus subjected to differential pressure conditions existing between atmospheric pressure of chamber 43 and manifold vacuum of chamber 38 vented to the intake manifold of engine 10 through tube 52 as hereinafter described.

The valve 40 is urged upwardly against the action of the diaphragm 41 by spring 48 surrounding the boss 39 and interposed between the floor of chamber 38 and the lower washer member 46.

Chamber 38 is vented to manifold vacuum through a passage 49 communicating with vacuum chamber 50 formed in the cover 42 and having an upstanding hollow boss 51, the interior of the boss 51 being vented to manifold vacuum by means of tube 52 vented to the intake manifold as at 52a below throttle valve 53. Thus, by means of the tube 52, both the chamber 50 and the chamber 38 are vented to manifold vacuum.

The chamber 54 is provided in the casing 24 and is vented to atmosphere as at 55. A second diaphragm 56 is clamped between the cover 42 and the body 24 to separate the chambers 50 and 54. A sleeve 57 is threadedly retained in the chamber 54, the sleeve being axially apertured as at 58 and having a peripheral groove 59 joined to the bore 58 by communicating radial passages 60. A valve 61, having a conical seating face 62, extends through the axial bore 58 and is secured to the diaphragm 56 by washer members 63 and 64. A compression spring 65 is interposed between the boss 51 and the washer member 63 to urge the valve downwardly tending to move the seating face 62 of valve 61 away from seated position and a second spring 66 is interposed between sleeve 57 and a bonnet 67 threadedly retained on the other end of valve 61, the spring 66 also urging the valve 61 away from seated position.

A conduit 68 connects the passage 34 through tube 35 with the axial bore 58 of sleeve 57 and supplementary fuel may flow from the flow chamber 22 through the restricted orifice 33 into passage 34 through conduit 68, bore 58, passages 60, groove 59 and a tube 69 connecting groove 59 with a bore 70 in casing 24. Bore 70 is in communication with the throat of venturi 20 through a nozzle 71 extending through the air intake 19 of the engine to the venturi 20.

The compression strength of the spring 48 and the resistance of the diaphragm 41 are adjusted so that the spring 48 will unseat the valve 40 from its seated position against seat 47 when the manifold vacuum drops below a predetermined value on the order of from 35 to 50 inches of water. Upon lifting the valve from its seated position, as illustrated in Figure 3, communication will be established between the passage 34 and passage 68. Supplementary fuel may flow through these passageways into the venturi 20 for subsequent injection into the combustion chambers of the engine. As shown in Figure 3, upon lifting of the valve by the action of spring 48 metering occurs through the orifice 33 and the opening afforded between the end of the valve 40 and the top of the tube 35. When the valve 40 is fully opened the radial passageway 73 is closed by the boss 39 and no flow through the by-pass conduit 72 is possible. However, when valve 40 is seated by diaphragm 41 at vacuums in excess of that necessary to overcome the resistance of the spring 40, fluid flowing through the passage 34 will be by-passed through axial bore 72 and radial bore 73 directly into the passage 68. The radial passage 73 defines a restricted orifice through which certain restricted flow may take place, the amount of fluid flowing through passage 73 being less than that flowing into the passage 68 when the valve is unseated as shown in Figure 3.

Valve 61, controlled by diaphragm 56 acting against the compressive strength of compression springs 65 and 66, may also be seated from the open position of Figure 2 when the manifold vacuum in chamber 50 exceeds a given value, when the valve is unseated, or open, as shown in Figure 2 fluid flow is established from the passage 68 through bore 58, radial bore 60 and groove 59 into passages 69 and 70 and nozzle 71. When the valve 61 is seated against the sleeve 57, flow of fluid through the bore 58 is interrupted and no fuel flow takes place. The comparative compressive strength of the springs 65 and 66 is so calibrated with relation to the resistance of the diaphragm 56 that the valve 61 is closed when the manifold vacuum is greater than from 70 to 100 inches of water.

Thus, by means of the present invention supplementary fuel fed from the flow chamber 22 through the nozzle 71 is controlled in accordance with the manifold vacuum with the two valves being operable under different manifold vacuums to insure the feeding of supplementary fuel in accordance with the manifold vacuum of the engine as vented through tube 52. On the rapid acceleration of the engine or operation of the engine under other circumstances which produce a low manifold vacuum very conducive to pre-ignition the valve 40 is unseated from the sleeve 47 and the flow of supplementary fuel to the engine is thereby established. However, at lesser manifold vacuums than those necessary to overcome the resistance of the diaphragm 41, flow is established through the by-pass conduit 72 and the metering orifice 73. In either instance, supplementary fuel flowing through the passage 68 is regulated by the setting of the valve 61 which setting is determined by the manifold vacuum, the valve 61 affording means for the regulation of flow in exact accordance with the operating characteristics of the engine.

In the embodiment illustrated in Figure 4 of the drawings parts similar to or identical to the embodiment illustrated in Figure 3 are indicated by identical reference numerals. In this embodiment of the invention, the float chamber 22 is provided with means for the introduction of supplementary fuel into the flow chamber to maintain a pond of fuel therein. This regulating mechanism is as above described and employs valve 26 controlled by a float 21 and acting against an orifice 27a. Float chamber 22 is defined by a main body section 74, a casing top 75 and a bottom closure plate 76. The main body section 74 carries an upstanding central boss 77 axially apertured at 78 and having a tube 79 threadedly retained therein. Tube 79 is provided with an axial passage 80, the tube 79 being vented to atmospheric pressure within the flow chamber 22 by a vent 81 and the passage 80 being vented at atmospheric pressure through holes 82.

A pair of somewhat smaller upstanding bosses 83 and 84 are disposed on either side of the central boss 77 within the flow chamber 22. These bosses 83 and 84 are centrally apertured as at 83a and 84a, respectively, to receive sleeves 85 and 86, respectively, threaded therein. The sleeves 85 and 86 are provided with central apertures 85a and 86a in communication with the interior of the flow chamber 22 through restricted orifices 85b and 86b. The sleeves 85 and 86 are also provided with outwardly flared lower portions 85c and 86c, respectively, extending into vacuum chambers 87 and 88, respectively, defined by mating recesses formed in casing sections 74 and 76.

The vacuum chambers 87 and 88 are vented through ports 89 and 90, respectively, to a single port chamber 91 in communication with the intake manifold of the engine through tube 92 extending into the intake manifold as at 93 below throttle valve 54. Tube 92 is maintained in position within bottom closure plate 76 by a nut 94 threadedly retained within depending boss 76a.

The sleeve 85 carries a diaphragm 95 extending across its lower flared portion 85c and the boss 86 carries a similarly positioned diaphragm 96. A diaphragm controlled metering valve 97 is mounted within sleeve 85 with its seating face 97a being adapted to close orifice 85b upon downward movement of the valve caused by movement of the diaphragm 95 secured to the valve 97 by washer members 98 and 99. The diaphragm 95 thus urges the valve to closed position against the action of spring 100 compressed between the sleeve 85 and the bonnet 101 threadedly retained on the shank of valve 97.

A similar valve 102 is provided for sleeve 84 with its seating face 102a being adapted to be seated within the orifice 86b. Diaphragm 96 likewise urges valve 102 to closed position against the action of spring 103 compressed between the upper surface of sleeve 86 and the bonnet 104 secured to the shank of valve 102.

Communication between the central aperture 85a and the passage 80 is afforded through passages 105 extending radially to the sleeve 85 and passage 106 extending from boss 83 to a chamber 107 formed in the lower portion of the upstanding boss 77. Similarly communication from the central portion 86 is provided through radial passage 108 and passage 109 extending through the boss to chamber 107. A metering orifice 110 is provided by a block positioned in the passage 109.

Each of the diaphragms 95 and 96 is subject to manifold vacuum on its undersurface by means of tube 92 and is subjected on its upper surface to atmospheric pressure within float chamber 22 together with the hydrostatic pressure generated by the amount of supplementary fuel standing therein. The vacuum on the lower surface of each of the diaphragms tends to pull the valve secured thereto to closed position sealing off the chambers 85a and 86a to prevent the flow of supplementary fuel into these chambers. Springs 100 and 103 resist the downward pull exerted upon the valves 97 and 102, respectively, and tends to urge the valve toward open position. The relative compressive strength of the spring and the flow resistance of the diaphragm may be so adjusted that the valves 97 and 102 will be closed at any given manifold vacuum, the springs 100 and 103 being sufficiently strong below this vacuum to overcome the downward pull of the diaphragms 95 and 96, respectively.

In the present invention, the spring 100 and the diaphragm 95 are preferably of such strength that the valve 97 will be opened at manifold vacuums of less than 35 to 50 inches of water and so that flow may be obtained therethrough at these vacuums or at lower vacuums. On the other hand, the valve 102 is preferably provided with diaphragm 96 and spring 103 of sufficient strength to maintain the valve in open position at any manifold vacuum less than from 70 to 100 inches of water. When the engine is operating under conditions such that the manifold vacuum is less than from about 35 to 50 inches of water, both valves are open and feeding of supplementary fuel through the passages 106 and 109 into the chamber 107 from this chamber into the passage 80 through orifice 107a and the passage 111 leading to nozzle 112 may be accomplished and supplementary fuel may be injected through the nozzle 112 into the throat of venturi 20. However, if the manifold vacuum increases into the range varying from 35 to 50 inches of mercury up to and including 70 to 100 inches of water only the valve 102 will be opened and supplementary fuel flow will be obtained only through passage 109 and the restricted orifice 110 into the tube 80 for subsequent injection into the venturi 20. At manifold vacuums of greater than 100 inches mercury, both valves will be closed and there would be no feeding of supplementary fuel into the venturi 20.

Thus, it may be seen that the present invention provides means whereby supplementary fuel is fed to the engine only during those periods of low vacuum at which engine knock is likely to occur. Further, the amount of supplementary fuel injected into the engine is determined by a plurality of valves disposed in the fuel feeding device and responsive to intake manifold vacuum so that the amount of supplementary fuel fed to the engine is varied in accordance with the anti-detonation requirements of the engine.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A device for feeding anti-detonant fluid to an internal combustion engine comprising a casing for containing a body of anti-detonant fluid, a conduit for connecting said body of fluid to the intake manifold of an internal combustion engine, and valve means controlling the flow of said fluid through said conduit to said engine, said valve means including a metering valve, a diaphragm for controlling said metering valve and having one side subjected to atmospheric pressure and the other side subjected to manifold vacuum to control movement of said valve in accordance with the operating characteristics of the engine, and a second metering valve, a diaphragm for controlling said second metering valve and having one side subjected to atmospheric pressure and the other side subjected to manifold vacuum to control movement of said valve in accordance with the operating characteristics of said engine, said valves being calibrated to successively close as intake manifold vacuum increases.

2. A device for feeding anti-detonant fluid to an internal combustion engine comprising a casing for containing a body of anti-detonant fluid, a conduit for connecting said body of fuel to a venturi located in the fluid intake of an internal combustion engine, and valve means located in said conduit for controlling the flow of said fluid therethrough, said valve means including a primary metering valve, a diaphragm for controlling said primary metering valve in accordance with differential pressure conditions, one side of said diaphragm subjected to atmospheric pressure and the other side subjected to manifold vacuum, said differential pressure conditions urging said valve to closed position, a spring urging said primary valve to open position against the resistance of said diaphragm, said spring being sufficient to overcome the resistance of said diaphragm at relatively low vacuums only, a secondary metering valve, a second diaphragm for said secondary metering valve for controlling the flow therethrough in accordance with differential pressure conditions, one side of said diaphragm being subjected to atmospheric pressure and the other side being subjected to manifold vacuum with said differential pressure conditions urging said valve to closed position, a second spring urging said valve to open position against the resistance of said diaphragm, said second spring being sufficient to overcome the resistance of said second diaphragm at manifold vacuum to establish flow through said secondary valve at manifold vacuums considerably in excess of those sufficient to close said first valve.

3. A supplementary fuel feeding device comprising a casing for containing a body of supplementary fuel, a conduit for connecting said body of fuel to the intake manifold of an internal combustion engine, and a pair of valves for controlling the introduction of supplementary fuel into said conduit for subsequent introduction into the intake manifold of the engine, said valves being responsive to the engine intake manifold vacuum with one of said valves establishing flow of supplementary fuel at relatively low vacuums particularly conducive to knock and interrupting the flow of supplementary fuel upon an increase of engine intake manifold vacuum, the other of said valves establishing flow of supplementary fuel at all conditions under which said first valve is open and being operable at relatively high vacuums to continue the feeding of supplementary fuel at vacuums in excess of those sufficient to close said first valve.

4. A device for feeding anti-detonant fluid to an internal combustion engine comprising a casing for containing a body of anti-detonant fluid, a conduit for connecting said body of fluid to the intake manifold of an internal combustion engine, and valve means for controlling the flow of said fluid from said body into said conduit, said valve means including a primary valve disposed in said conduit and operable to establish flow of said fluid through said conduit at relatively low manifold vacuums while interrupting the flow of fluid at relatively high manifold vacuums, said primary valve having a by-pass conduit for establishing a restricted flow of said fluid when the main flow of fluid therethrough is interrupted, and a secondary valve located in said conduit beyond said primary valve and operable to remain open under all engine operating conditions at which said main valve is open, and remaining open at manifold vacuums in excess of those sufficient to interrupt the flow of fluid through said primary valve to meter the flow of fluid through said by-pass, said secondary valve also being operable at high manifold vacuums to interrupt the flow of anti-detonant fluid when the engine is operating under conditions not conducive to engine pre-ignition and detonation.

5. In a device for feeding anti-detonant fluid to an internal combustion engine having a casing for containing a body of anti-detonant fluid and a conduit for connecting said body of fluid to the intake manifold of an internal combustion engine, tandem first and second valves located in said conduit for controlling the flow of said fluid therethrough, a diaphragm connected to each of said valves, said diaphragms having one surface exposed to atmospheric pressure and the other surface exposed to engine intake manifold vacuum, a spring for each of said valves thrusting against atmospheric pressure to urge said valves to open position to establish flow of anti-detonant fluid through said conduit, means on said first valve to establish restricted anti-detonant fluid flow therethrough when said valve is seated under high manifold vacuums, the diaphragm and spring controlling the movement of said first valve being calibrated to urge said valve to open position only at low manifold vacuums particularly conducive to engine detonation and pre-ignition, and the diaphragm and valve controlling said second valve being calibrated to establish flow of said fluid at intermediate and low manifold vacuums conducive to engine pre-detonation and knock, said second valve serving to meter flow from said first valve at low vacuums and from said means at higher vacuums, whereby the amount of anti-detonant fluid ejected into said engine may be varied in accordance with the intake manifold vacuum of said engine.

6. In a supplementary fuel feeding device having a casing for containing a body of supplementary fuel, a conduit for connecting said body of fuel to the intake manifold of an internal combustion engine, and valve means for controlling the introduction of supplementary fuel through said conduit in accordance with the manifold vacuum of said engine, additional valve means for controlling the flow of supplementary fuel comprising a valve, a diaphragm secured to said valve and subjected to differential atmospheric and intake manifold pressure to urge said valve to closed position, and a compression spring urging said valve into position against the action of said diaphragm, said diaphragm and said spring being calibrated to establish flow through said second valve under intake manifold vacuums sufficient to close said first valve.

7. A supplementary fuel feeding device comprising a casing for containing a body of supplementary fuel, a conduit connecting said body of fuel to the intake manifold of an internal combustion engine, valve means located in said casing for controlling the flow of supplementary fuel from said body into said intake manifold, said valve means including a first valve and a second valve controlled by differential pressure conditions existing between atmospheric pressure and engine intake manifold pressure, one of said valves being operable to establish flow of supplementary fuel at intake manifold vacuums considerably in excess of those sufficient to interrupt the flow through said first valve.

8. A supplementary fuel feeding device comprising a casing for containing a body of supplementary fuel, a conduit for connecting said body of fuel to the intake manifold of an internal combustion engine, and valve means for controlling the flow of supplementary fuel from said body to said intake manifold including a first valve and a second valve submerged in said body of supplementary fuel, and a diaphragm for each of said valves subjected on one side to engine intake manifold vacuum and subjected on its other side to atmospheric pressure plus hydrostatic pressure of said body of supplementary fuel, said first valve being operable at low engine intake manifold vacuums to meter supplementary fuel through said conduit and being closed at greater intake manifold vacuums to interrupt the flow of supplementary fuel through said conduit, said second valve being operable to establish flow of supplementary fuel into said conduit at intake manifold vacuums in excess of those sufficient to seat said first valve, and said second valve also being operable at elevated engine intake manifold vacuums to interrupt the flow of supplementary fuel under engine operating conditions not conducive to knock or pre-detonation.

9. A feeding device actuated by intake manifold pressure of an internal combustion engine which comprises a casing having a float chamber, means in said casing providing a discharge passage communicating with the lower portion of said float chamber, a fixed orifice in said discharge passage, means for bleeding air into fluid flowing through said discharge passage, a plurality of valves controlling flow from said float chamber through said discharge passage, and an actuator for each of said valves adapted to be operatively vented to the intake manifold of an internal combustion engine for successively closing the valves as the manifold pressure decreases whereby fluid from the float chamber will be admixed with air and metered in controlled quantities successively decreasing under the influence of the plurality of valves as the intake manifold pressure decreases.

10. A supplementary fuel feed device for an internal combustion engine adapted to be actuated by intake manifold pressure of the engine which comprises a casing having a chamber for a pond of supplementary fuel and a discharge outlet, means defining a passageway from the lower portion of said chamber to the discharge outlet of said casing, a fixed orifice in said passageway, means for venting air into said passageway for admixture with fuel metered by the fixed orifice, a first vacuum-operated valve in said passageway regulating flow of air and fuel, a second vacuum-actuated valve in said passageway regulating flow from the first valve to the discharge outlet, said valves being constructed and arranged so that the first valve will close at relatively low vacuums while the second valve will remain open until appreciably high vacuums are reached in the engine, and said first valve having a by-pass metering means therethrough to meter fuel to the second valve when the first valve is closed.

11. A supplementary fuel feeding device for an internal combustion engine comprising a casing for containing a body of supplementary fuel, a conduit communicating with said casing for withdrawing fuel therefrom, a valve seat in said conduit, a first diaphragm controlled valve coacting with said seat and responsive to manifold vacuum of said engine to establish full fuel flow through said conduit at low vacuums only, means for by-passing lesser amounts of fuel past said first valve and through said conduit at intake manifold vacuums in excess of those which initiate flow through said first valve, a by-pass chamber for receiving fuel from said conduit, means for introducing fuel from said chamber into said engine, and a second diaphragm controlled valve interposed between said conduit and said by-pass chamber, said second valve being responsive to engine intake manifold vacuum to control fuel flow to said chamber from said by-passing means.

12. A supplementary fuel feeding device for injecting supplementary fuel to the intake manifold of an internal combustion engine, comprising a casing for containing a body of supplementary fuel, a conduit for withdrawing fuel from said casing, means responsive to engine intake manifold vacuum for establishing full fuel flow through said conduit at low manifold vacuums and a fixed restricted flow at higher manifold vacuums, a by-pass chamber for receiving fuel flow from the conduit, means responsive to engine intake manifold vacuum for controlling fuel flow through said chamber, said means being effective to stop fuel flow under the influence of high manifold vacuums, and a conduit for introducing fuel from said chamber into the intake manifold of said engine, the co-action of said manifold vacuum responsive means accurately correlating the introduction of supplementary fuel to the engine in accordance with the actual operating conditions of the engine to prevent engine detonation and pre-ignition.

13. A feed device for an internal combustion engine which comprises casing means having a liquids chamber and a discharge passageway communicating with said chamber, fixed orifice means in said discharge passageway, air bleed means in said discharge passageway for admixing air with liquid flowing therethrough from said chamber, at least a pair of valves controlling flow from said chamber through said discharge passageway, means responsive to intake manifold pressure for closing one of said valves with manifold pressure decreased to a predetermined value, and means responsive to intake manifold pressure for closing another of said valves with manifold pressure decreased to a value less than said predetermined value.

14. A feed device for an internal combustion engine which comprises a casing defining a liquids chamber, and having a discharge passageway leading from the lower portion of said chamber, at least a pair of valves controlling flow from said chamber through said discharge passageway, means responsive to intake manifold pressure for closing one of said valves with manifold pressure decreased to a predetermined value, and means responsive to intake manifold pressure for closing another of said valves with manifold pressure decreased to a value less than said predetermined value.

15. A fuel feed device for the carburetor of an internal combustion engine which comprises a casing defining a float chamber, a pair of valves controlling flow out of the bottom of said float chamber, a first spring urging one of said valves open, a first diaphragm subjected to intake manifold vacuum for closing said one of said valves with manifold vacuum increased to a predetermined value, a second spring urging the other of said valves open, a second diaphragm subjected to intake manifold vacuum for closing said other of said valves with manifold vacuum increased to a value greater than said predetermined value, and a common discharge port for said valves.

DAVID E. ANDERSON.

REFERENCES CITED

The following references are of record in the file of this patent:

UNITED STATES PATENTS

| Number | Name | Date |
|---|---|---|
| 1,990,702 | Leibing | Feb. 12, 1935 |
| 2,070,009 | Goodman | Feb. 9, 1937 |
| 2,227,267 | Lozivit | Dec. 31, 1940 |
| 2,291,418 | Storer | July 28, 1942 |
| 2,337,982 | Ericson | Dec. 28, 1943 |
| 2,407,535 | Carlson et al. | Sept. 10, 1946 |
| 2,448,131 | Williams et al. | Aug. 31, 1948 |
| 2,458,256 | Crozier et al. | Jan. 4, 1949 |
| 2,477,481 | Ericson | July 26, 1949 |